United States Patent
Saito

(10) Patent No.: US 7,729,228 B2
(45) Date of Patent: Jun. 1, 2010

(54) OPTICAL PICKUP AND OPTICAL DISC APPARATUS

(75) Inventor: Masahiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 975 days.

(21) Appl. No.: 11/495,740

(22) Filed: Jul. 31, 2006

(65) Prior Publication Data
US 2007/0035837 A1 Feb. 15, 2007

(30) Foreign Application Priority Data
Aug. 9, 2005 (JP) .............................. 2005-231274

(51) Int. Cl.
*G11B 7/00* (2006.01)
(52) U.S. Cl. .................. 369/112.03; 359/563; 359/566; 359/575; 369/44.37; 369/44.32; 369/112.05
(58) Field of Classification Search ............. 369/44.37, 369/112.01, 112.05, 112.23, 44.23, 44.24, 369/44.32, 112.03, 112.06; 359/563, 566, 359/575
See application file for complete search history.

(56) References Cited

U.S. PATENT DOCUMENTS

2005/0180295 A1* 8/2005 Mimori .................. 369/112.07

FOREIGN PATENT DOCUMENTS

| JP | 2004-152443 | 5/2004 |
|---|---|---|
| JP | 2005-11466 | 1/2005 |
| JP | 2005-38575 | 2/2005 |
| JP | 2005-158217 | 6/2005 |
| JP | 2006-127714 | 5/2006 |
| WO | WO 03/091764 | 11/2003 |

* cited by examiner

*Primary Examiner*—Wayne R Young
*Assistant Examiner*—Dionne H Pendleton
(74) *Attorney, Agent, or Firm*—Oblon, Spivak, McClelland, Maier & Neustadt, L.L.P.

(57) ABSTRACT

An optical pickup which includes first to third light sources each emitting a light beam each having a first to third wavelength; an objective lens condensing each of the light beams emitted from the light sources on a signal recording face of an optical disc; a collimator lens provided between the light sources and the objective lens to convert a divergent angle of each of the light beams emitted from the light sources so as to obtain a parallel light beam; and a diffractive optical element provided between the collimator lens and the objective lens. The diffractive optical element includes first and second diffractive parts which respectively diffract the light beam having the second wavelength and the third wavelength. The second diffractive part has a diffraction structure formed by a plurality of concentric ring zones, having first to fourth optical faces, each having a different height in an optical axis direction.

7 Claims, 8 Drawing Sheets

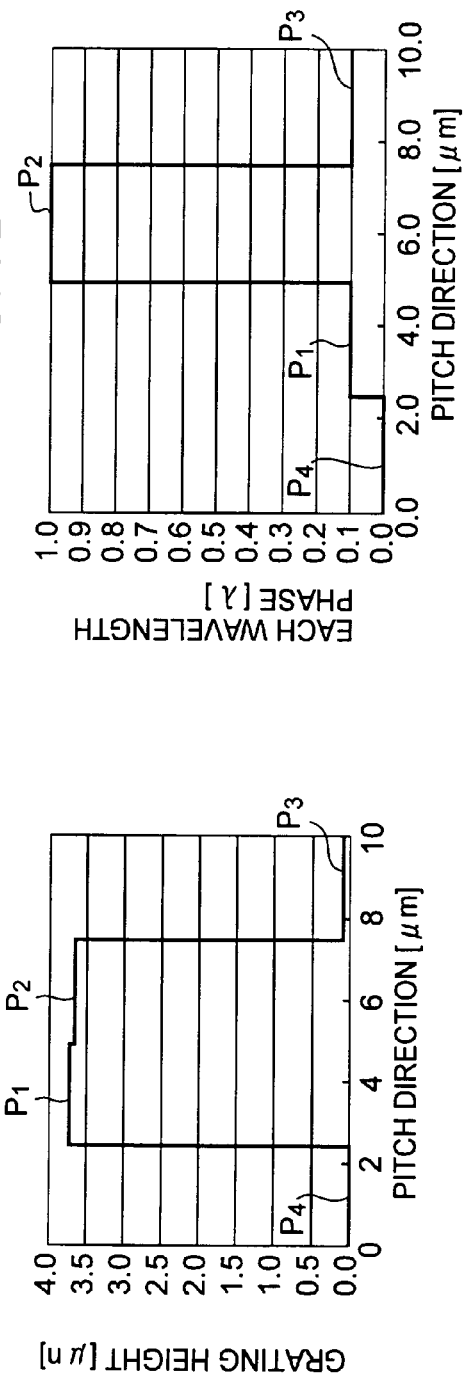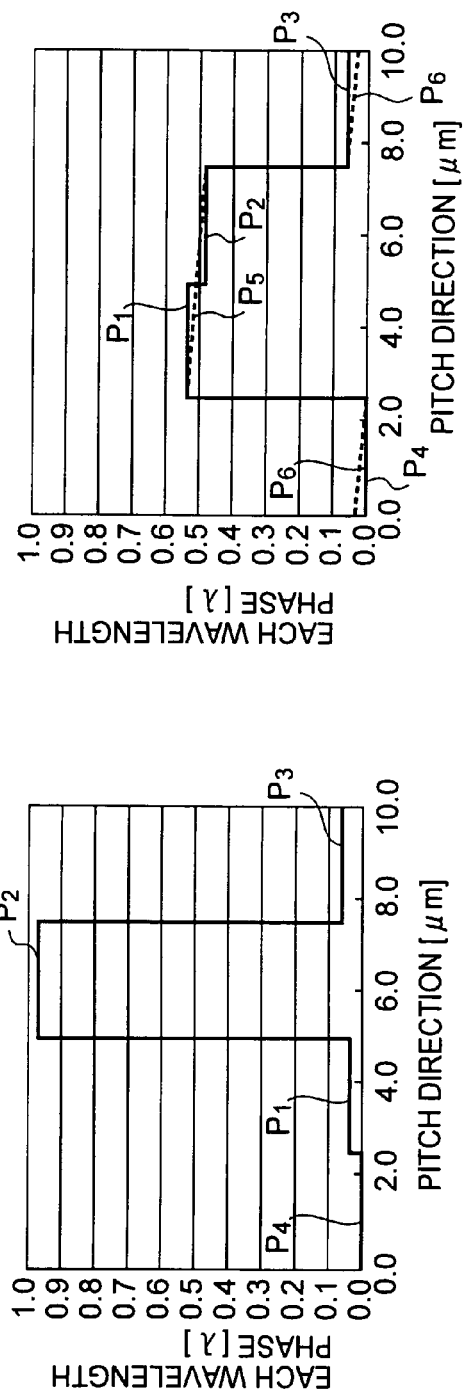

OPTICAL PICKUP AND OPTICAL DISC APPARATUS

CROSS REFERENCES TO RELATED APPLICATIONS

The present document contains subject matter related to Japanese Patent Application JP 2005-231274 filed in the Japanese Patent Office on Aug. 9, 2005, the entire contents of which being incorporated herein by reference.

BACKGROUND OF THE INVENTION

1. Field of the Invention

The present invention relates to an optical pickup and an optical disc apparatus, which use light beams having different wavelengths to record and/or reproduce information on/from a plurality of types of information recording mediums such as optical discs.

2. Description of the Related Art

As a next-generation optical disc format, a format using a blue-violet semiconductor laser which emits a light beam having a wavelength of about 400 nm to 410 nm as a light source is currently employed.

For providing an optical pickup compatible with the next-generation optical discs, an optical pickup having compatibility with optical discs in different format such as existing CD (Compact Disc) and DVD (Digital Versatile Disc) is desired. As described above, an optical pickup and an optical disc apparatus, which have compatibility with optical discs in formats using different disc structures and different laser specifications in accordance with the different disc structures, are required.

As an optical pickup for recording and reproducing an information signal on/from a plurality of types of optical discs using different wavelengths as described above, there exists an optical pickup including a plurality of objective lenses compatible with the respective optical discs.

The optical pickup using a plurality of objective lenses includes a correspondingly large number of components. Therefore, there is a possibility that the size of the optical disc apparatus or the fabrication cost may be increased.

As an optical pickup for recording and reproducing an information signal on/from a plurality of types of optical discs using different wavelengths, an optical pickup including a single objective lens and an optical element for converting a divergent angle of a light beam incident on the objective lens in accordance with its wavelength is conceivable.

Specifically, Japanese Patent Application Publication (KOKAI) 2005-38575 discloses an optical pickup 100 as shown in FIG. 8. The optical pickup 100 uses an objective lens 103 for focusing a light beam having a first wavelength of about 405 nm on a signal recording face of a first optical disc compatible with the first wavelength. The optical pickup 100 includes a first diffractive element using the objective lens 103 to change an incident angle of a light beam having a second wavelength of about 660 nm so that the light beam is focused on a signal recording face of a second optical disc compatible with the second wavelength and a second diffractive element 104 using the objective lens 103 to change an incident angle of a light beam having a third wavelength of about 785 nm so that the light beam is focused on a single recording face of a third optical disc compatible with the third wavelength.

As the second diffractive element 104, a diffraction grating having a grating height equal to integral multiples of 405 nm and 660 nm corresponding to the first wavelength and the second wavelength as shown in FIG. 9 is used.

SUMMARY OF THE INVENTION

However, such a second diffractive element (diffraction grating) 104 transmits a light beam $B_1$ having the first wavelength and a light beam $B_2$ having the second wavelength while generating −first-order light $B_{3c5}$ using a light beam $B_3$ having the third wavelength. At the same time, the diffraction grating 104 generates the substantially same amount of +first-order light $B_{3c6}$ as that of the −first-order light, which in turn becomes stray light. There is a possibility that the generation of stray light may deteriorate a signal. A broken line $B_{3c7}$ in FIG. 8 indicates a focal position when 0-th order light is incident on the objective lens 103.

The present invention is to provide an optical pickup and an optical disc apparatus, which use a common objective lens to allow a light beam having a corresponding wavelength to be condensed on a signal recording face in an appropriate spot shape and appropriate amount for a plurality of types of optical discs, each including a protective substrate having a different thickness, so as to enable the recording and reproduction of an information signal on/from the plurality of types of optical discs.

An optical pickup according to an embodiment of the present invention includes: a first light source; a second light source; a third light source; an objective lens; a collimator lens and a diffractive optical element. The first light source emits a light beam having a first wavelength. The second light source emits a light beam having a second wavelength. The third light source emits a light beam having a third wavelength. The objective lens condenses each of the light beams emitted from the first to third light sources on a signal recording face of an optical disc. The collimator lens is provided between the first to third light sources and the objective lens to convert a divergent angle of each of the light beams emitted from the first to third light sources so as to obtain a parallel light beam. The diffractive optical element is provided between the collimator lens and the objective lens. The diffractive optical element includes a first diffractive part for diffracting the light beam having the second wavelength and a second diffractive part for diffracting the light beam having the third wavelength. The second diffractive part has a diffraction structure formed by a plurality of concentric ring zones. The diffraction structure includes first to fourth optical faces, each having a different height in an optical axis direction, formed in a stepwise and continuous manner.

An optical disc apparatus according to an embodiment of the present invention includes: an optical pickup for recording and/or reproducing information on/to a plurality of different types of optical discs; and disc rotational driving means for rotatably driving the optical discs. In the optical disc apparatus, the optical pickup includes: a first light source; a second light source; a third light source; an objective lens; a collimator; and a diffractive optical element. The first light source emits a light beam having a first wavelength. The second light source emits a light beam having a second wavelength. The third light source emits a light beam having a third wavelength. The objective lens condenses each of the light beams emitted from the first to third light sources on a signal recording face of the optical disc. The collimator lens is provided between the first to third light sources and the objective lens to convert a divergent angle of each of the light beams emitted from the first to third light sources so as to obtain a parallel light beam. The diffractive optical element is provided between the collimator lens and the objective lens.

The diffractive optical element includes a first diffractive part for diffracting the light beam having the second wavelength and a second diffractive part for diffracting the light beam having the third wavelength. The second diffractive part has a diffraction structure formed by a plurality of concentric ring zones. The diffraction structure includes first to fourth optical faces, each having a different height in an optical axis direction, formed in a stepwise and continuous manner.

According to the embodiments of the present invention, the first diffractive part of the diffractive optical element diffracts the light beam having the second wavelength so that the diffracted light is incident on the objective lens at an optimal divergent angle, whereas the second diffractive part of the diffractive optical element diffracts the light beam having the third wavelength so that the diffracted light is incident on the objective lens in an optimal amount and at an optimal divergent angle. As a result, the spot shape and the amount of the light beam having each of the wavelengths can be made appropriate with respect to the signal recording face of each of the plurality of different types of optical discs, each including the protective substrate having a different thickness.

Accordingly, since the present invention enables the reading and writing of a signal from/on the plurality of types of optical discs and the optical components can be shared, the structure can be simplified and reduced in size. As a result, fabrication cost can be reduced.

BRIEF DESCRIPTION OF THE DRAWINGS

FIG. 6A is a sectional view showing a diffractive part in Comparative Example 1 formed to have a diffraction grating shape, and FIG. 6B is a sectional view showing a diffractive part in Comparative Example 2 formed in a blazed shape;

FIGS. 7A to 7D are views, each for illustrating a phase with respect to each wavelength of the second diffractive part of the optical pickup to which the present invention is applied, where FIG. 7A is a view showing a height of each optical face in an optical axis, FIG. 7B is a view showing a wavelength phase converted for a first wavelength, FIG. 7C is a view showing a wavelength phase converted for a second wavelength, and FIG. 7D is a view showing a wavelength phase converted for a third wavelength;

DESCRIPTION OF THE EMBODIMENTS

Hereinafter, an optical disc apparatus using an optical pickup, to which the present invention is applied, will be described with reference to the accompanying drawings.

Figure 1:
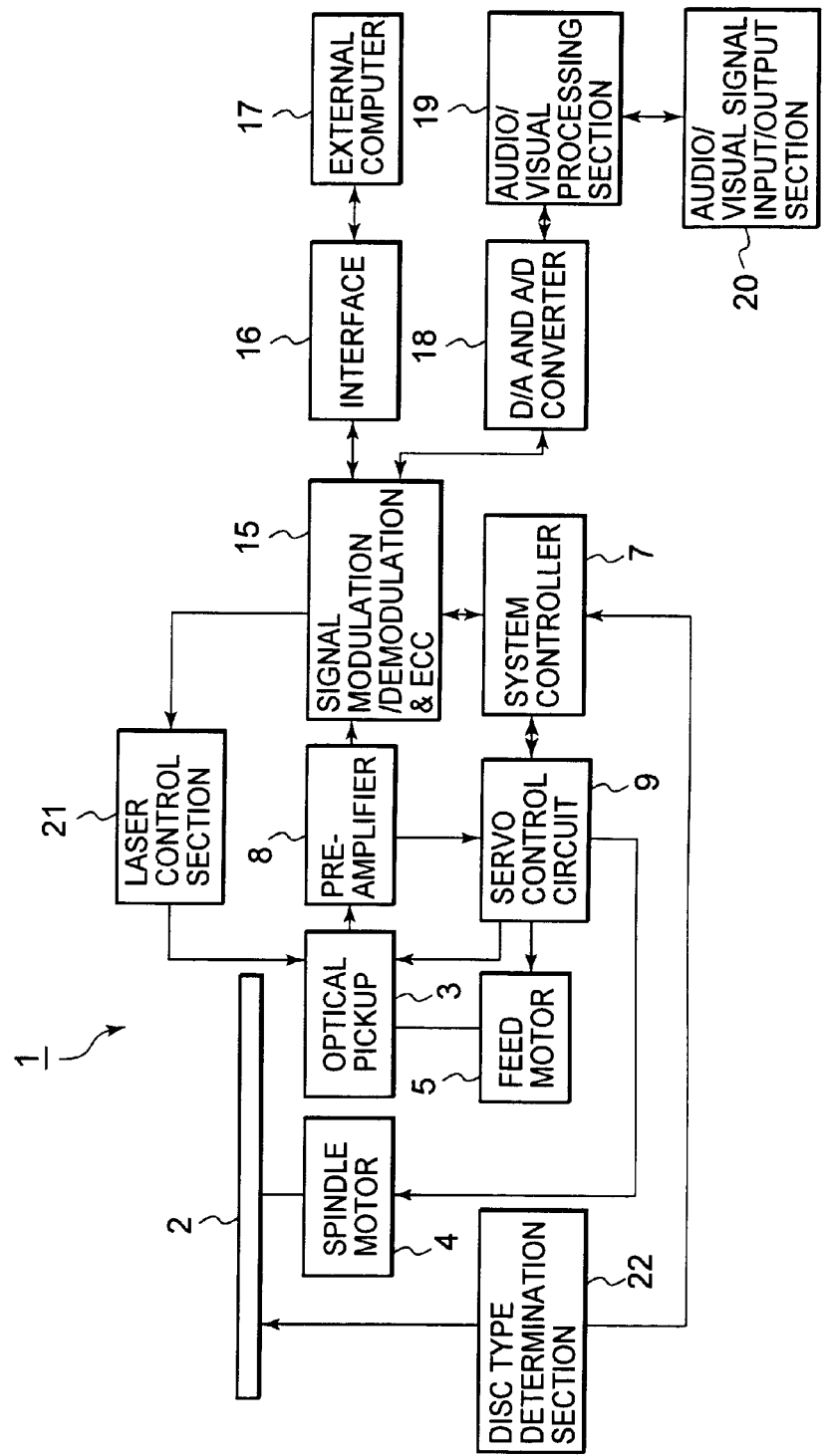
FIG. 1 is a circuit block diagram showing a structure of an optical disc apparatus to which the present invention is applied.

An optical disc apparatus 1, to which the present invention is applied, includes, as shown in FIG. 1: an optical pickup 3 for recording and reproducing information on/from an optical disc 2; a spindle motor 4 serving as driving means for rotatably operating the optical disc 2; and a feed motor 5 for moving the optical pickup 3 in a radial direction of the optical disc 2. The optical disc apparatus 1 realizes the compatibility that allows recording and/or reproduction on/from a plurality of types of optical discs in different formats.

The optical disc 2 used in this embodiment is, for example, an optical disc such as a CD (Compact Disc), a DVD (Digital Versatile Disc), a CD-R (Recordable) and a DVD-R (Recordable) to which information can be additionally written, and a CD-RW (ReWritable), a DVD-RW (ReWritable) and a DVD+RW (ReWritable) on which information is rewritable, and optical disc on which high-density recording using a semiconductor laser having a shorter emission wavelength of about 405 nm (blue-violet light), a magneto-optical disc, and the like.

In particular, in the following description, as three types of optical discs from/on which information is reproduced or recorded by the optical disc apparatus 1, a first optical disc 11, a second optical disc 12, and a third optical disc 13 are used. The first optical disc 11 enables high-density recording and includes a protective substrate having a thickness of 0.1 mm and uses a light beam having a wavelength of about 405 nm as recording/reproducing light. The second optical disc 12 is a DVD or the like which includes a protective substrate having a thickness of 0.6 mm and uses a light beam having a wavelength of about 660 nm as recording/reproducing light. The third optical disc 13 is a CD or the like which includes a protective substrate having a thickness of 1.2 mm and uses a light beam having a wavelength of about 785 nm as recording/reproducing light.

In the optical disc apparatus 1, the spindle motor 4 and the feed motor 5 are controlled to be driven by a servo control circuit 9 in accordance with the type of disc. The servo control circuit 9 is controlled based on an instruction from a system controller 7 which also serves as disc type determination means. The spindle motor 4 and the feed motor 5 are driven at a predetermined number of revolutions in accordance with the type of disc, for example, depending on the first optical disc 11, the second optical disc 12 or the third optical disc 13.

The optical pickup 3 includes an optical system having compatibility with a plurality of formats. The optical pickup 3 radiates light beams having different wavelengths on recording layers of optical discs in different standards and detects reflected light of the light beam from the recording layer. The optical pickup 3 supplies a signal corresponding to each of the light beams from the detected reflected light to a pre-amplifier section 8.

An output from the pre-amplifier section 8 is transmitted to a signal modulator/demodulator and error correction code block (hereinafter, referred to as a signal modulation/demodulation & ECC block) 15. The signal modulation/demodulation & ECC block 15 modulates and demodulates a signal and adds an error correction code (ECC). The optical pickup 3 radiates a light beam on a recording layer of the optical disc 2 rotating in response to an instruction from the signal modulation/demodulation & ECC block 15 to record or reproduce a signal on/from the optical disc 2.

The pre-amplifier section 8 is configured to generate a focus error signal, a tracking error signal, an RF signal or the like based on the signal corresponding to the light beam detected differently for each format. In accordance with the type of the optical disc 2 being a target medium on/from which recording or reproduction is to be performed, a predetermined process such as demodulation and an error correction process based on the standard of the optical disc 2 is performed by the servo control circuit 9, the signal modulation/demodulation & ECC block 15 or the like.

For example, if a recording signal demodulated by the signal modulation/demodulation & ECC block 15 is for data storage of a computer, the recording signal is transmitted to an external computer 17 via an interface 16. As a result, the external computer 17 or the like can receive a signal recorded on the optical disc 2 as a reproduction signal.

On the other hand, if a recording signal demodulated by the signal modulation/demodulation & ECC block 15 is for audio visual, the recording signal is subjected to digital-analog conversion in a D/A converting section of a D/A and A/D converter 18 to be supplied to an audio visual processing section 19. Then, the signal is subjected to an audio visual process in the audio visual processing section 19 to be transmitted to an external image projector (not shown) or the like via an audio visual signal input/output section 20.

In the optical pickup 3, for example, the control of the feed motor 5 for moving the optical pickup 3 to a predetermined recording track on the optical disc 2, the control of the spindle motor 4, and the control of the focusing-direction and tracking-direction driving of a biaxial actuator for holding the objective lens serving as light condensing means in the optical pickup 3 are performed by the servo control circuit 9.

A laser control section 21 controls a laser light source of the optical pickup 3. In this specific example, in particular, the laser control section 21 controls the laser light source to vary output power between a recording mode and a reproduction mode. The laser control section 21 also controls the laser light source to vary the output power in accordance with the type of the optical disc 2. The laser control section 21 switches the laser light source of the optical pickup 3 in accordance with the type of the optical disc 2 detected by the disc type determining section 22.

The disc type determining section 22 can detect a different format of the optical disc 2 based on a difference in surface reflectance, shape, profile or the like between the first to third optical discs 11 to 13.

Each of the blocks constituting the optical disc apparatus 1 is configured to enable signal processing based on a specification of the optical disc to be loaded, in accordance with the result of detection in the disc type determining section 22.

The system controller 7 determines the type of the optical disc 2 based on the result of detection transmitted from the disc type determining section 22. As a technique of determining the type of the optical disc, if the optical disc is housed within a cartridge, a technique of providing a detection hole through the cartridge and using a contact detection sensor or a push switch to detect the type of the optical disc is given as an example. For determination of a recording layer in the same optical disc, a method of determining a recording layer for which recording/reproduction is performed based on information in a Table Of Contents (TOC) recorded in a pre-mastered pit or groove on the innermost circumference of the optical disc can be used.

The servo control circuit 9 detects, for example, a relative position between the optical pickup 3 and the optical disc 2 (including the case where the position is detected based on an address signal recorded on the optical disc 2) to determine a recording area on/from which information is recorded and/or reproduced.

The optical disc apparatus 1 configured as described above rotatably drives the optical disc 2 with the spindle motor 4, controls the driving of the feed motor 5 in accordance with a control signal from the servo control circuit 9, and moves the optical pickup 3 to the position corresponding to a desired recording track on the optical disc 2, thereby recording/reproducing information on/from the optical disc 2.

Hereinafter, the above-described optical pickup 3 for recording/reproduction will be described in detail.

The optical pickup 3 performs recording and/or reproduction on/from a plurality of optical discs, each including a protective substrate having a different thickness for protecting a signal recording face. Specifically, the description will be given, assuming that the optical pickup 3 performs recording and/or reproduction on/from the first optical disc 11, the second optical disc 12 and the third optical disc 13. The first optical disc 11 includes a first protective substrate having a first thickness of about 0.1 mm and uses the light beam having a first wavelength of about 405 nm as recording/reproducing light. The second optical disc 12 includes a second protective substrate having a second thickness of about 0.6 mm and uses a light beam having a second wavelength of about 660 nm as recording/reproducing light. The third optical disc 13 includes a third protective substrate having a third thickness of about 1.2 mm and uses a third light beam having a wavelength of about 785 nm as recording/reproducing light.

Figure 2:
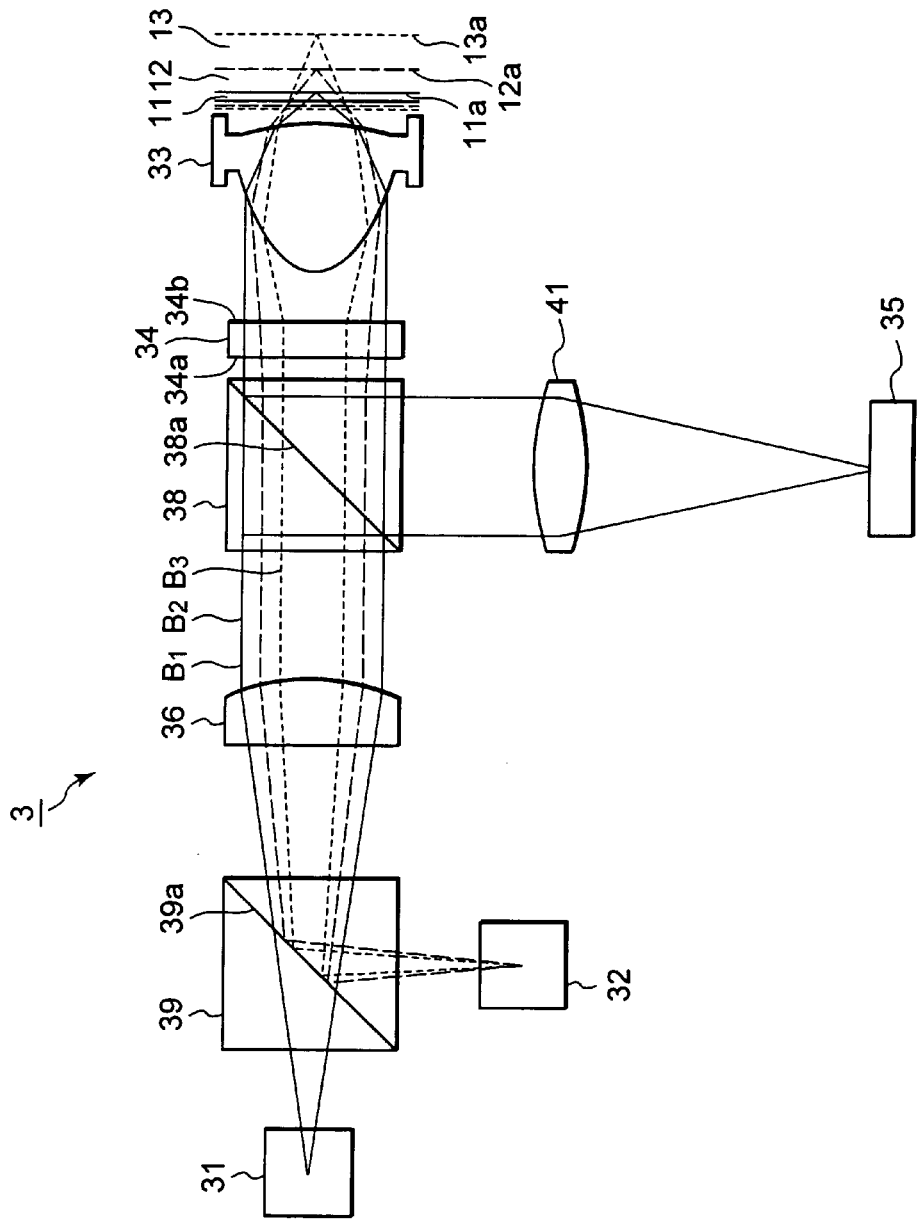
FIG. 2 is a ray diagram showing an optical system of an optical pickup to which the present invention is applied.

The optical pickup 3, to which the present invention is applied, includes, as illustrated in FIG. 2: a first light source section 31; a second light source section 32; an objective lens 33; a diffractive optical element 34; and a photodetector 35. The first light source section 31 has a first emission part for emitting the light beam having the first wavelength. The second light source section 32 has a second emission part for emitting the light beam having the second wavelength and a third emission part for emitting the light beam having the third wavelength. The objective lens 33 condenses each of the light beams emitted from the first to third emission parts on a signal recording face of the optical disc 2. The diffractive optical element 34 has a first diffractive part 34*a* and a second diffractive part 34*b*, is provided between the objective lens 33, and the first light source section 31 and the second light source section 32. The photodetector 35 detects return light reflected by the signal recording face of the optical disc 2.

The optical pickup 3 also includes: a collimator lens 36; a first beam splitter 38; and a second beam splitter 39. The collimator lens 36 is provided between the first to third emission parts and the diffractive optical element 34, and converts divergence angles of the light beams emitted from the first to third emission parts. The first beam splitter 38 is provided between the collimator lens 36 and the diffractive optical element 34, and splits an optical path of the return light reflected by the signal recording face from an optical path of outgoing light to guide the return light to the photodetector 35. The second beam splitter 39 is provided between the first light source section 31 and the second light source section 32, and the collimator lens 36, and serves as optical path combining means for combining an optical path of the light beam emitted from the first light source section 31 and an optical path of the light beam emitted from the second light source section 32.

The first light source section 31 includes the first emission part for emitting the light beam having the first wavelength of about 405 nm to the first optical disc 11. The second light source section 32 includes the second emission part for emitting the light beam having the second wavelength of about 660 nm to the second optical disc 12 and the third emission part for emitting the light beam having the third wavelength of about 785 nm to the third optical disc 13.

Although the first to third emission parts are provided in the first light source section 31 or the second light source section 32 in the optical pickup 3, the arrangement of the first to third emission parts is not limited thereto. For example, the first to third emission parts may be provided in one of the light source sections or may be separately provided in an individual light source section.

The second beam splitter 39 includes, for example, a mirror face 39a having wavelength selectivity. The mirror face 39a transmits the light emitted from the first emission part of the first light source section 31 while reflecting the light beams emitted from the second and third emission parts of the second light source section 32, thereby combining the optical paths of the light beams respectively emitted from the first to third emission parts.

The collimator lens 36 converts a divergent angle of the light beam emitted from each of the emission parts of the first light source section 31 or the second light source section 32 to convert the light beam to a substantially parallel light beam. Then, the collimator lens 36 allows the light beam to travel toward the first beam splitter 38.

The diffractive optical element 34 is provided on the optical paths of the light beams having the first to third wavelengths. Specifically, the diffractive optical element 34 is provided between the first beam splitter 38 and the objective lens 33, and includes a first diffractive part 34a on the light incoming-side face corresponding to one face of the diffractive optical element 34 and a second diffractive part 34b on the light outgoing-side face corresponding to the other face.

The first diffractive part 34a transmits the light beams $B_1$ and $B_3$ having the first and third wavelengths while diffracting the light beam $B_2$ having the second wavelength. The first diffractive part 34a diffracts the light beam $B_2$ having the second wavelength to form an appropriate spot shape of the light beam $B_2$ having the second wavelength focused through the objective lens 33 on a signal recording face 12a of the second optical disc 12. Specifically, the first diffractive part 34a changes the divergent angle of the light beam $B_2$ having the second wavelength so that the light beam $B_2$ having the second wavelength is appropriately condensed through the objective lens 33 to adjust the focus. The first diffractive part 34a also corrects a spherical aberration generated when the light beam $B_2$ having the second wavelength is condensed on the signal recording face 12a of the second optical disc 12 through the objective lens 33, that is, a spherical aberration generated by using the same objective lens 33 for the plurality of types of optical discs, each including the protective substrate having a different thickness.

The second diffractive part 34b transmits the light beams $B_1$ and $B_2$ having the first and second wavelengths while diffracting the light beam $B_3$ having the third wavelength. The second diffractive part 34b diffracts the light beam $B_3$ having the third wavelength to form an appropriate spot shape of the light beam $B_3$ having the third wavelength focused through the objective lens 33 on a signal recording face 13a of the third optical disc 13. Specifically, the second diffractive part 34b changes the divergent angle of the light beam $B_3$ having the third wavelength so that the light beam $B_3$ having the third wavelength is appropriately condensed through the objective lens 33 to adjust the focus. The second diffractive part 34b also corrects a spherical aberration generated when the light beam $B_3$ having the third wavelength is condensed on the signal recording face 13a of the third optical disc 13 through the objective lens 33, that is, a spherical aberration generated by using the same objective lens 33 for the plurality of types of optical discs, each including the protective substrate having a different thickness.

Next, the structures of the first and second diffractive parts 34a and 34b will be described. A hologram is formed on each of the first and second diffractive parts 34a and 34b. The hologram has a stepwise shape with a predetermined number of concentric ring-like steps, each having a predetermined phase depth.

Figure 4:
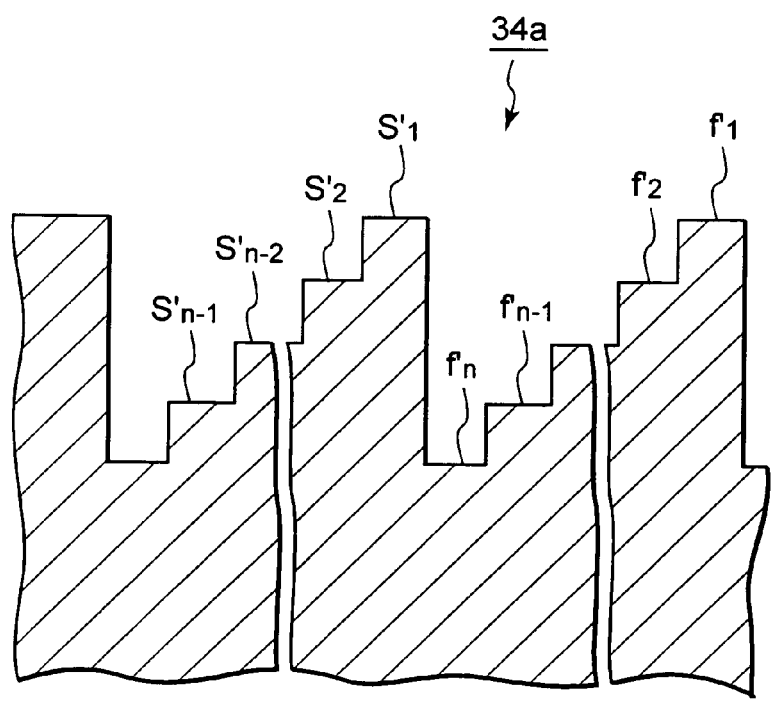
FIG. 4 is a sectional view showing a first diffractive part of the diffractive optical element constituting the optical pickup to which the present invention is applied.

Specifically, on the first diffractive part 34a, the stepwise hologram with a predetermined number n of steps (n is an integer equal to or larger than 2), as shown in FIG. 4, and with first to (n−1)-th step levels $S'_1$, $S'_2$ to $S'_{n-2}$ and $S'_{n-1}$ is formed. In other words, there is formed the stepwise hologram on which first to n-th concentric ring-like optical faces $f'_1$, $f'_2$ to $f'_{n-1}$ and $f'_n$ are continuously formed.

A level difference between the adjacent optical faces $f'_1$, $f'_2$ to $f'_{n-1}$, and $f'_n$ of the first diffractive part 34a is substantially the same. Specifically, the level difference between the adjacent optical faces is formed to transmit the light beams $B_1$ and $B_3$ having the first and third wavelengths and to diffract the light beam B 2 having the second wavelength so that the divergent angle allows the light beam $B_2$ to be condensed on the second optical disc 12 in an appropriate spot shape. A radial width of each of the optical faces $f'_1$, $f'_2$ to $f'_{n-1}$ and $f'_n$ for one cycle is formed to be substantially the same. For example, the first diffractive part 34a has a stepwise shape with five steps. (n=5). Each level difference between the optical faces is set to be a value calculated by: $2 \times \lambda_1/(n_1-1)$. Specifically, each level difference is set equal to two wavelengths of the first wavelength $\lambda_1$ and a wavelength of the third wavelength $\lambda_3$ so that the first diffractive part 34a substantially transmits the light beams having the first and third wavelengths.

The first diffractive part 34a configured as described above has a diffraction structure formed of the plurality of concentric ring zones as described above. With this structure, the first diffractive part 34a substantially transmits the light beams having the first and third wavelengths while diffracting the light beam having the second wavelength at an appropriate divergent angle and in an appropriate amount. As a result, the diffracted light can be condensed in an appropriate spot shape on the second recording face 12a of the second optical disc 12 through the objective lens 33.

Figure 5:
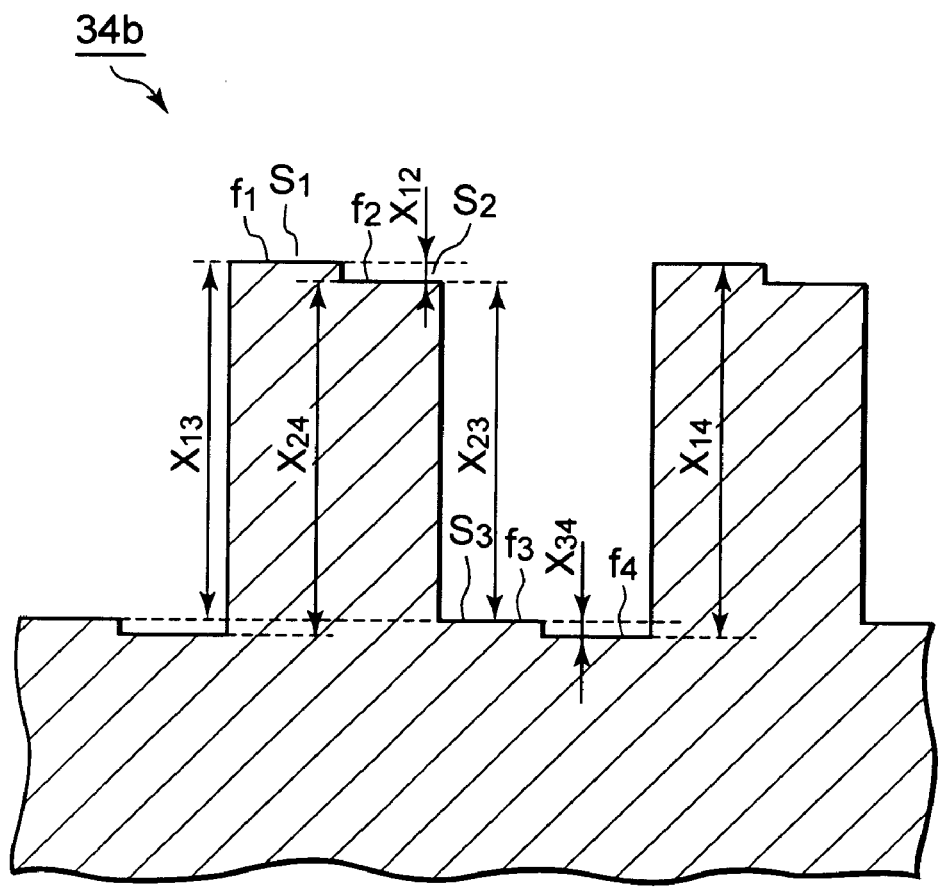
FIG. 5 is a sectional view showing a second diffractive part of the diffractive optical element constituting the optical pickup to which the present invention is applied.

The second diffractive part 34b has a stepwise shape with four steps. Specifically, as shown in FIG. 5, the second diffractive part 34b has a stepwise hologram formed to have a first to third step levels $S_1$ to $S_3$ and concentric ring-like first to fourth optical faces $f_1$ to $f_4$ formed in a continuous manner. The first to fourth optical faces $f_1$ to $f_4$ are formed to have different heights in the optical axis direction, specifically, formed at different positions in the optical axis. Therefore, level differences between the adjacent optical faces are not all the same. The first optical face $f_1$ is positioned outermost, specifically, positioned on the side close to the objective lens 33. The second optical face $f_2$ is positioned on the inner side of the first optical face $f_1$; the third optical face $f_3$ is positioned on the inner side of the second optical face $f_2$; and the fourth optical face $f_4$ is positioned on the inner side of the third optical face $f_3$. In this manner, the first to fourth optical faces are sequentially and continuously formed in a stepwise manner.

Each of the optical faces of the second diffractive part 34b is formed with a level difference and a width. The level difference and the width transmit the light beams $B_1$ and $B_2$ having the first and second wavelengths to be transmitted.

They also diffract the light beam $B_3$ having the third wavelength to the -first-order diffracted light providing such a divergent angle that allows the light beam $B_3$ to be condensed in an appropriate spot shape on the third optical disc 13 through the objective lens 33 and the +first-order diffracted light with a less amount of diffraction than that of the -first-order diffracted light. More specifically, the second diffractive part 34b diffracts the light beam $B_3$ having the third wavelength so that a ratio ($E_2/E_1$) of the amount of diffraction $E_2$ of the -first-order diffracted light of the light beam $B_3$ having the third wavelength to the amount of diffraction $E_1$ of the +first-order diffracted light becomes 1.5 or larger. The diffracted light focused on the side apart from a focal point of 0-th order diffracted light (hereinafter, referred to as "0-th order light") is referred to as the -first-order diffracted light (hereinafter, referred to as "-first-order diffracted light"), and the diffracted light focused on the side closer to the focal point of the 0-th order light is referred to as the +first-order diffracted light (hereinafter, referred to as "first-order diffracted light").

A level difference $X_{23}$ between the second optical face $f_2$ and the third optical face $f_3$ of the second diffractive part 34b is formed larger than a level difference $X_{12}$ between the first optical face $f_1$ and the second optical face $f_2$ and a level difference $X_{34}$ between the third optical face $f_3$ and the fourth optical face $f_4$.

For the second diffractive part 34b, a level difference $X_{13}$ between the first optical face $f_1$ and the third optical face $f_3$ and a level difference $X_{24}$ between the second optical face $f_2$ and the fourth optical face $f_4$ are formed to satisfy the following Formulae (1) and (2), respectively.

$$5 \times \lambda_1/(n_1-1) \leq X_{13} \leq 3 \times \lambda_2/(n_2-1) \quad (1)$$

$$5 \times \lambda_1/(n_1-1) \leq X_{24} \leq 3 \times \lambda_2/(n_2-1) \quad (2)$$

In the Formulae (1) and (2), and Formulae (3) and (4) described below, $\lambda_1$ is the first wavelength, $\lambda_2$ is the second wavelength, $n_1$ is a refractive index of the diffractive optical element with respect to the first wavelength, and $n_2$ is a refractive index of the diffractive optical element with respect to the second wavelength.

By respectively setting the level differences $X_{13}$ and $X_{24}$ in the ranges satisfying Formulae (1) and (2), the light beams $B_1$ and $B_2$ having the first and second wavelengths can be transmitted, whereas the light beam $B_3$ having the third wavelength can be diffracted to generate diffracted light at an appropriate divergent angle.

Furthermore, for the second diffractive part 34b, the level difference $X_{12}$ between the first optical face $f_1$ and the second optical face $f_2$ and the level difference $X_{34}$ between the third optical face $f_3$ and the fourth optical face $f_4$ are formed to satisfy the following Formulae (3) and (4).

$$0.065 \times \lambda_1/(n_1-1) \leq X_{12} \leq 0.165 \times \lambda_1/(n_1-1) \quad (3)$$

$$0.065 \times \lambda_1/(n_1-1) \leq X_{34} < 0.165 \times \lambda_1/(n_1-1) \quad (4)$$

In Formulae (3) and (4), a lower limit indicates a limit of causing unbalance at the ratio ($E_2/E_1$) of 1.5 or larger in the amounts of the ±first-order light of the light beam having the third wavelength described below. An upper limit indicates a limit of ensuring 90% or more of the amount of 0-th order light of the light beams having the first and second wavelengths described below. Specifically, if the level difference $X_{12}$ or $X_{34}$ becomes smaller than $0.065 \times \lambda_1/(n_1-1)$, a necessary amount of the -first-order light of the light beam having the third wavelength cannot be obtained. At the same time, the amount of the +first-order light becomes large. On the other hand, if the level difference $X_{12}$ or $X_{34}$ becomes larger than $0.165 \times \lambda_1(n_1-1)$, the amount of the 0th-order light of each of the light beams $B_1$ and $B_2$ having the first and second wavelengths becomes smaller.

For example, based on the fourth optical face $f_4$ as a reference, the positions of the first to third optical faces $f_1$ to $f_3$, that is, the level differences $X_{14}$, $X_{24}$ and $X_{34}$ indicating the heights in the optical axis direction are: $X_{14}$=3.713 μm, $X_{24}$=3.643 μm, and $X_{34}$=0.070 μm. In other words, the level difference $X_{12}$ between the first optical face $f_1$ and the second optical face $f_2$ is 0.070 μm, the level difference $X_{23}$ between the second optical face $f_2$ and the third optical face $f_3$ is 3.573 μm, and the level difference $X_{13}$ between the first optical face $f_1$ and the third optical face $f_3$ is 3.643 μm. The radial widths of the first to fourth optical faces $f_1$ to $f_4$ for one cycle are formed substantially equal to each other. The width for one cycle varies so as to decrease toward the outer side.

The diffractive optical element 34 provided with the second diffractive part 34b has a refractive index $n_1$ of 1.556 with respect to the first wavelength (405 nm), a refractive index $n_2$ of 1.539 with respect to the second wavelength (660 nm), and a refractive index $n_3$ of 1.536 with respect to the third wavelength (785 nm).

The left-hand side indicating the lower limits of the level differences $X_{13}$ and $X_{24}$ in Formulae (1) and (2) is obtained by the following Formula (5), the right-hand side indicating the upper limits of the level differences $X_{13}$ and $X_{24}$ in Formulae (1) and (2) is obtained by the following Formula (6), the left-hand side indicating the lower limits of the level differences $X_{12}$ and $X_{34}$ in Formulae (3) and (4) is obtained by the following Formula (7), and the right-hand side indicating the upper limits of the level differences $X_{12}$ and $X_{34}$ in Formulae (3) and (4) is obtained by the following Formula (8).

$$5 \times \lambda_1/(n_1-1) = 5 \times 0.405/(1.556-1) = 3.6421 \quad (5)$$

$$3 \times \lambda_2/(n_2-1) = 3 \times 0.660/(1.539-1) = 3.6734 \quad (6)$$

$$0.065 \times \lambda_1/(n_1-1) = 0.065 \times 0.405/(1.556-1) = 0.473 \quad (7)$$

$$0.165 \times \lambda_1/(n_1-1) = 0.165 \times 0.405/(1.556-1) = 0.1201 \quad (8)$$

The diffraction structure including the plurality of concentric ring zones as described above is formed on the second diffractive part 34b configured as described above. As a result, the second diffractive part 34b diffracts the light beams $B_1$ to $B_3$ having the first to third wavelengths at diffraction efficiencies shown in Table 1. Table 1 shows the diffraction efficiencies of the first to third wavelengths at the respective orders. Specifically, the second diffractive part 34b substantially transmits the light beams $B_1$ and $B_2$ having the first and second wavelengths while diffracting the light beam $B_3$ having the third wavelength. Then, the second diffractive part 34b allows the -first-order light to outgo at a diffraction efficiency of 52.4% and the +first-order light to outgo at a diffraction efficiency of 28.5%.

TABLE 1

| | Light beam $B_1$ having the first wavelength (405 nm) | Light beam $B_2$ having the second wavelength (660 nm) | Light beam $B_3$ having the third wavelength (785 nm) |
|---|---|---|---|
| -fifth-order light | 0.0% | 0.0% | 2.1% |
| -fourth-order light | 0.0% | 0.0% | 0.0% |
| -third-order | 0.0% | 0.0% | 3.2% |

TABLE 1-continued

| | Light beam $B_1$ having the first wavelength (405 nm) | Light beam $B_2$ having the second wavelength (660 nm) | Light beam $B_3$ having the third wavelength (785 nm) |
|---|---|---|---|
| −second-order light | 3.6% | 1.3% | 0.0% |
| −first-order light | 0.0% | 0.3% | 52.4% |
| 0 th-order light | 91.2% | 96.3% | 0.2% |
| +first-order light | 0.0% | 0.1% | 28.5% |
| +second-order light | 3.6% | 1.3% | 0.0% |
| +third-order light | 0.0% | 0.0% | 5.8% |
| +fourth-order light | 0.0% | 0.0% | 0.0% |
| +fifth-order light | 0.0% | 0.0% | 1.1% |

The second diffractive part 34b substantially transmits the light beams $B_1$ and $B_2$ having the first and second wavelength so that each of the light beams $B_1$ and $B_2$ outgoes toward the objective lens 33 in the optimal amount. On the other hand, the second diffractive part 34b allows the −first-order light of the light beam $B_3$ having the third wavelength to outgo toward the objective lens 33 in the optimal amount at the optimal divergent angle. As a result, the −first-order light can be condensed in an appropriate spot shape on the signal recording face 13a of the third optical disc 13 through the objective lens 33. When the second diffractive part 34b generates the −first-order light of the light beam having the third wavelength, the second diffractive part 34b can reduce the amount of diffraction of the +first-order light which is inevitably generated with the −first-order light. Therefore, the generation of stray light can be prevented.

Specifically, the second diffractive part 34b substantially transmits the light beams having the first and second wavelengths and regulates the balance of the diffraction orders of the +−order light of the light beam having the third wavelength diffracted for converting the divergent angle. The obtained unbalance improves the diffraction efficiency of the desired −first-order light while reducing the diffraction efficiency of the +first-order light which may possibly be stray light.

As described above, the diffractive optical element 34 includes the first and second diffractive parts 34a and 34b to condense each of the light beams having the respective wavelengths in an appropriate spot shape in an appropriate amount on the signal recording face of the optical disc corresponding to each of the light beams.

Although the second diffractive part 34b is configured so as to improve the diffraction efficiency of the −first-order light and to condense the −first-order light on the third optical disc in this embodiment, the present invention is not limited thereto. For example, the second diffractive part 34b may be configured so as to reduce the amount of diffraction of the −first-order light and to increase the amount of diffraction of the +first-order light.

The achievement of unbalance of the amounts of diffraction of the ±first-order light of the light beam having the third wavelength by the above-described second diffractive part 34b will be described.

First, with reference to FIG. 6A, a diffractive part in Comparative Example 1 for comparison with the second diffractive part 34b constituting the present invention will be described.

Figure 6B:
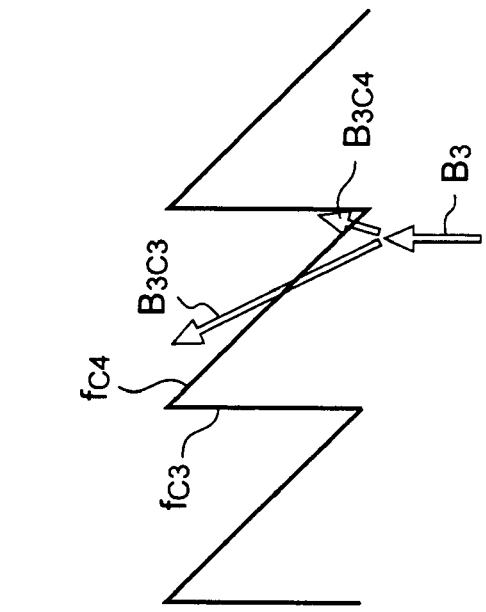
FIGS. 6A and 6B are views, each for illustrating a diffractive part according to Comparative Example for comparison with the second diffractive part of the optical pickup to which the present invention is applied, where
Figure 6A:
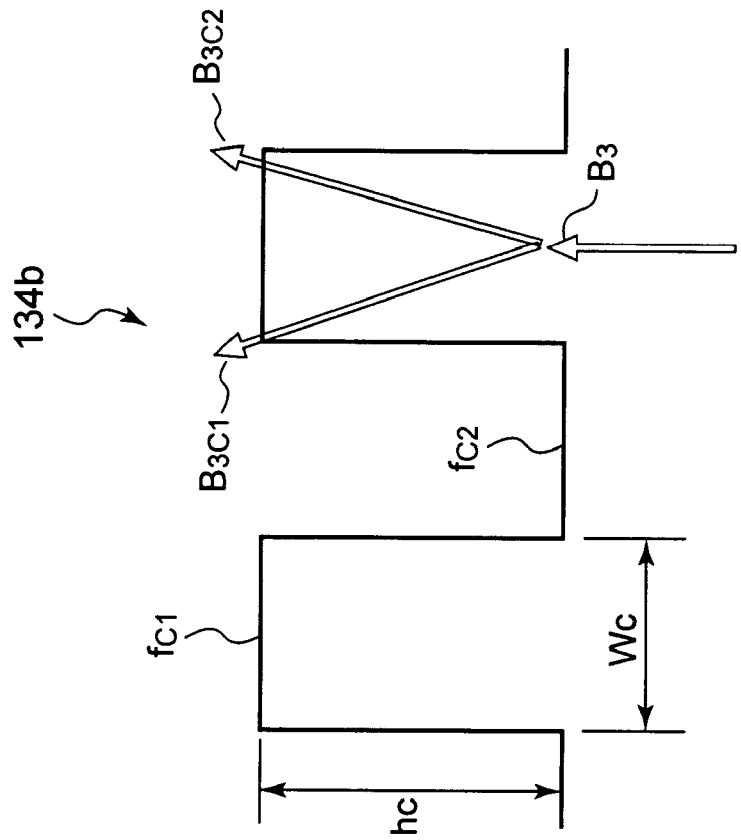
Figure 8:
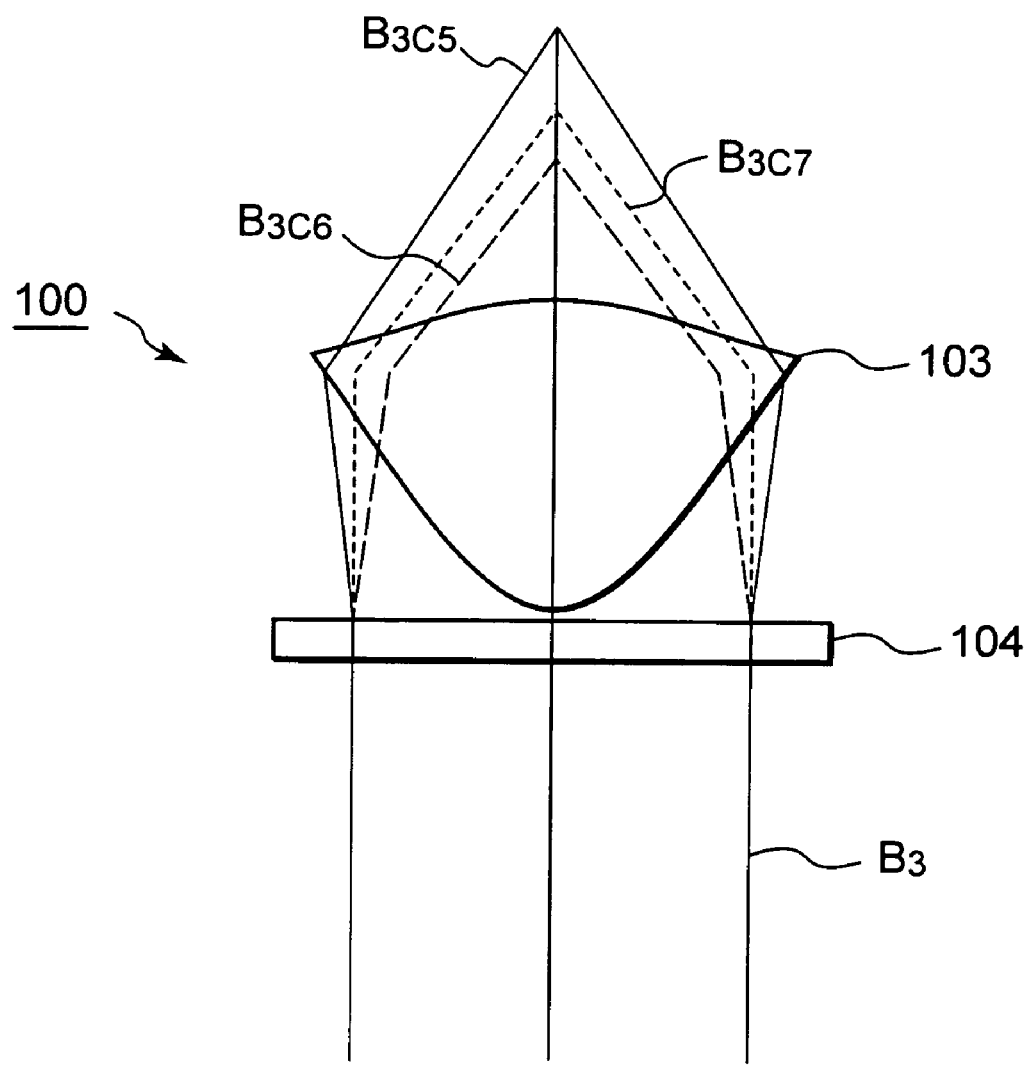
FIG. 8 is a sectional view showing an objective lens an a diffraction grating constituting a related art optical pickup.
Figure 9:
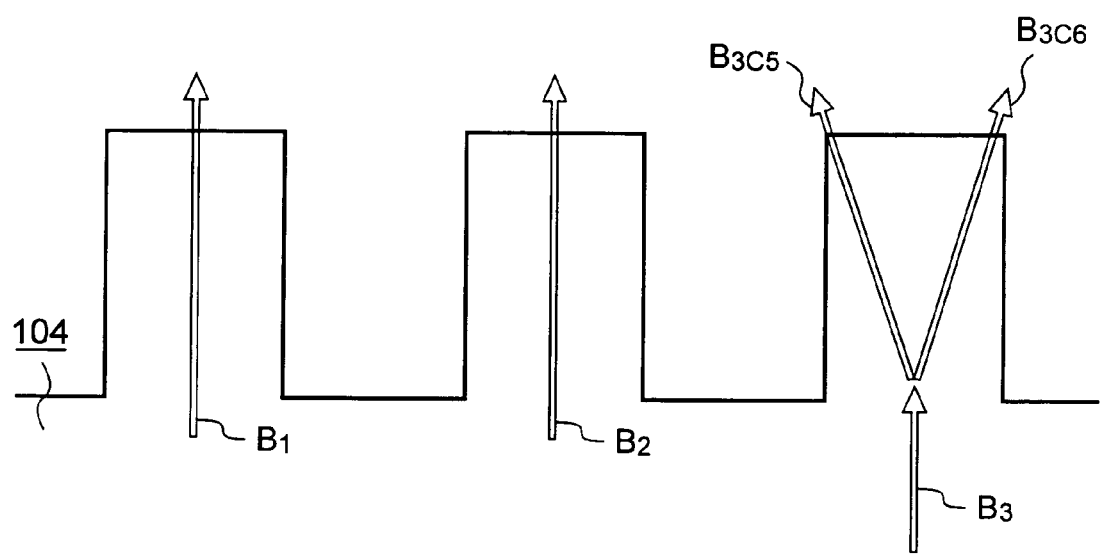
FIG. 9 is a sectional view showing the diffraction grating of the related art optical pickup.

As shown in FIG. 6A, a diffractive part 134b of a diffractive optical element in Comparative Example 1 has a so-called diffraction grating shape with a first optical face $f_{c1}$ and a second optical face $f_{c2}$ being continuously formed. The diffractive part 134b regulates a level difference hc between the first optical face $f_{c1}$ and the second optical face $f_{c2}$, which corresponds to a depth of the diffraction grating, so as to transmit a light beam having a predetermined wavelength and to diffract another light beam having a predetermined wavelength to ±first-order light. Specifically, when hc=3.65 μm and a width Wc of the first optical face $f_{c1}$ and the second optical face $f_{c2}$ in a radial direction is 0.5 μm, diffraction efficiencies of the light beams $B_1$ to $B_3$ having the first to third wavelengths at the respective orders are as shown in Table 2.

TABLE 2

| | Light beam $B_1$ having the first wavelength (405 nm) | Light beam $B_2$ having the second wavelength (660 nm) | Light beam $B_3$ having the third wavelength (785 nm) |
|---|---|---|---|
| −third-order light | 0.0% | 0.0% | 4.5% |
| −second-order light | 0.0% | 0.0% | 0.0% |
| −first-order light | 0.0% | 0.0% | 40.5% |
| 0 th-order light | 100.0% | 100.0% | 0.0% |
| +first-order light | 0.0% | 0.0% | 40.5% |
| +second-order light | 0.0% | 0.0% | 0.0% |
| +third-order light | 0.0% | 0.0% | 4.5% |

The above results can be obtained because the level difference ha between the first optical face $f_{c1}$ and the second optical face $f_{c2}$ is set to a multiple integer of the wavelengths of the light beam $B_1$ having the first wavelength and the light beam $B_2$ having the second wavelength to transmit the light beam $B_1$ having the first wavelength and the light beam $B_2$ having the second wavelength. On the other hand, in the diffractive part 134b, there is a limit in improving the diffraction efficiency of the −first-order light $B_{3c1}$ of the light beam having the third wavelength. At the same time, substantially the same amount of +first-order light $B_{3c2}$ is generated. Therefore, the diffractive part 134b is disadvantageous in that stray light is generated by the +first-order light $B_{3c2}$ or the like.

Next, with reference to FIG. 6B, a diffractive part 144b in Comparison Example 2 for solving the problems of the diffractive part 134b in Comparison Example 1 will be described.

As shown in FIG. 6B, the diffractive part 144b in Comparison Example 2 has a so-called blazed shape including a face $f_{c3}$ parallel to the optical axis direction and an inclined face $f_{c4}$ inclined from a face perpendicularly crossing the optical axis direction. Such a diffractive part 144b regulates a height of the inclined face $f_{c4}$ to unbalance the diffraction efficiencies of the ±first-order light. Specifically, it becomes possible to increase the −first-order light $B_3$ $c_3$ while reducing the +first-order light $B_{3c4}$. On the other hand, however, it is difficult for the diffractive part 144b to transmit the most of the light beam $B_1$ having the first wavelength and the light beam $B_2$ having the second wavelength which differ from each other.

Therefore, the above-described second diffractive part 34b constituting the present invention is formed to have four small level differences formed by the first to fourth optical faces as shown in FIG. 5. As a result, the second diffractive part 34b can be configured to have a pseudo-inclined face with respect to the light beam $B_3$ having the third wavelength.

FIG. 7A shows a height of each of the optical faces of the second diffractive part 34b in the optical axis direction with respect to the reference face, whereas FIGS. 7B to 7D show the state where the height of each of the optical faces is converted to each wavelength phase when the light beam $B_1$ having the first wavelength, the light beam $B_2$ having the second wavelength, and the light beam $B_3$ having the third wavelength pass through the second diffractive part 34b, respectively. In FIGS. 7A to 7D, $P_1$ to $P_4$ respectively denote areas where the first to fourth optical faces are formed. The height in the optical axis direction in FIG. 7A and each of the wavelength phases in FIGS. 7B to 7D are determined based on the fourth optical face $f_4$ serving as the reference face.

FIGS. 7B to 7D can be calculated by dividing the level differences $X_{14}$, $X_{24}$ and $X_{34}$ from the fourth optical face $f_4$ serving as the reference face to the first to third optical faces $f_1$ to $f_3$ by $(\lambda_1/(n_1-1))$, $(\lambda_2/(n_2-1))$ and $(\lambda_3/(n_3-1))$, respectively.

As shown in FIGS. 7B and 7C, the light beam $B_1$ having the first wavelength and the light beam $B_2$ having the second wavelength are substantially transmitted equally to a case where no level difference is provided. In other words, for the light beam $B_1$ having the first wavelength and the light beam $B_2$ having the second wavelength, the heights of the first to fourth optical faces $f_1$ to $f_4$, which are all converted to wavelengths, are within the range of $\pm 0.1\lambda/(n_x-1)$. As a result, the 0th-order light is dominantly generated. Herein, $\lambda$ denotes each of the wavelengths, and $n_x$ denotes a refractive index with respect to each of the wavelengths.

On the other hand, as shown in FIG. 7D, for the light beam $B_3$ having the third wavelength, as in the case where a pseudo-inclined faces indicated by broken lines $P_5$ and $P_6$ in FIG. 7D are provided, the diffraction efficiencies of ±first-order light are unbalanced. Specifically, the amount of the −first-order light can be increased with respect to that of the +first-order light, thereby obtaining the diffraction efficiencies as shown in Table 1 above. In other words, the formation of the small level differences indicated by the level differences $X_{12}$ and $X_{34}$ allows each of the first and second optical faces $f_1$ and $f_2$ corresponding to a top face and the third and fourth optical faces $f_3$ and $f_4$ corresponding to a bottom face to be a pseudo-inclined face as indicated by the broken lines $P_5$ and $P_6$. As a result, the unbalance of the amounts of the −first-order light and the +first-order light can be achieved.

For the second diffractive part 34b, the level difference $X_{23}$ between the second optical face $f_2$ and the third optical face $f_3$ is set larger than the level difference $X_{12}$ between the first optical face $f_1$ and the second optical face $f_2$ and the level difference $X_{34}$ between the third optical face $f_3$ and the fourth optical face $f_4$. Therefore, each of the top face $f_1$ and $f_2$ and the bottom face $f_3$ and $f_4$ is formed as a pseudo-inclined face to produce the same effect as in the case where inclined faces are formed as the top face and the bottom face. As a result, the amounts of diffraction of ±first-order light can be unbalanced. Moreover, by defining the level differences between the first to fourth optical faces $f_1$ to $f_4$ as described above, the second diffractive part 34b can substantially transmit the light beam $B_1$ having the first wavelength and the light beam $B_2$ having the second wavelength while diffracting the light beam $B_3$ having the third wavelength so that the ratio of the amount of diffraction of the −first-order light to that of the +first-order light is 1.5 or larger. As a result, an appropriate amount of the −first-order light at an optimal divergent angle which allows the light beam $B_3$ having the third wavelength to be condensed in an appropriate spot shape on the signal recording face 13a of the third optical disc 13 through the objective lens 33 can outgo toward the objective lens 33. At the same time, the amount of diffraction of the +first-order light is reduced to prevent the generation of stray light.

The above-described first and second diffractive parts 34a and 34b of the diffractive optical element 34 described above may be formed by molding using a resin material or may be formed by etching using a glass or the like. Although the first and second diffractive parts 34a and 34b are formed on both sides of the single diffractive optical element 34, i.e., on the light-incident side and the light-emission side, in this embodiment, the positions of the first and second diffractive parts 34a and 34b are not limited thereto. The first and second diffractive parts 34a and 34b may be provided for individual diffractive optical elements.

Although the first wavelength is 405 nm, the second wavelength is 660 nm and the third wavelength is 785 nm in the above description, the wavelengths are not limited thereto. The same diffraction efficiencies as those described above can be obtained by the diffractive optical element 34 satisfying the above-described Formulae (1) to (4) as long as the first wavelength is in the range of 400 nm to 410 nm, the second wavelength in the range of 650 nm to 660 nm, and the third wavelength is in the range of 775 nm to 790 nm.

The objective lens 33 is an objective lens compatible with three wavelengths. A numerical aperture of the objective lens 33 is 0.85 for the first wavelength, 0.60 for the second wavelength, and 0.45 for the third wavelength. The objective lens 33 can condense the light beam having the first wavelength having a divergent angle converted by the collimator lens 36 so as to be a substantially parallel light beam on the signal recording face 11a of the first optical disc 11 having the first protective substrate thickness. The objective lens 33 can condense the light beam having the second wavelength, which is diffracted by the first diffractive part 34a of the diffractive optical element 34 to convert its divergent angle after being converted by the collimator lens 36 to a substantially parallel light beam, on the signal recording face 12a of the second optical disc 12 having the second protective substrate thickness. Furthermore, the objective lens 33 can condense the light beam having the third wavelength, which is diffracted by the second diffractive part 34b of the diffractive optical element 34 to convert its divergent angle after being converted by the collimator lens 36 to a substantially parallel light beam, on the signal recording face 13a of the third optical disc 13 having the third protective substrate thickness. The light beams having the first to third wavelengths are incident on the objective lens 33 respectively at appropriate divergent angles in accordance with the wavelengths owing to the diffractive optical element 34. As a result, the objective lens 33 achieves the compatibility with three different wavelengths. The numerical apertures for the respective wavelengths are not limited to those described above; for example, the numerical aperture may be about 0.60 to 0.65 for the second wavelength and about 0.45 to 0.51 for the third wavelength.

The first beam splitter 38 is provided on the optical path between the collimator lens 36 and the diffractive optical element 34. The mirror face 38a of the first beam splitter 38 transmits an outgoing light beam toward the objective lens 33 while splitting the optical path of return light from the optical disc 2 toward the photodetector 35. There is provided, between the first beam splitter 38 and the photo detector 35, an optical element 41 such as a cylindrical lens for focusing the light beam whose optical path is split on a light-receiving face of the photodetector 35.

Next, the optical paths of the light beams emitted from the first and second light source sections 31 and 32 in the optical pickup 3 will be described. First, the optical path for reading or writing information from/on the first optical disc 11 will be described.

After having determined that the type of the optical disc 2 is the first optical disc 11, the disc type determining section 22 causes the first emission part of the first light source section 31 to emit the light beam having the first wavelength.

Figure 3:
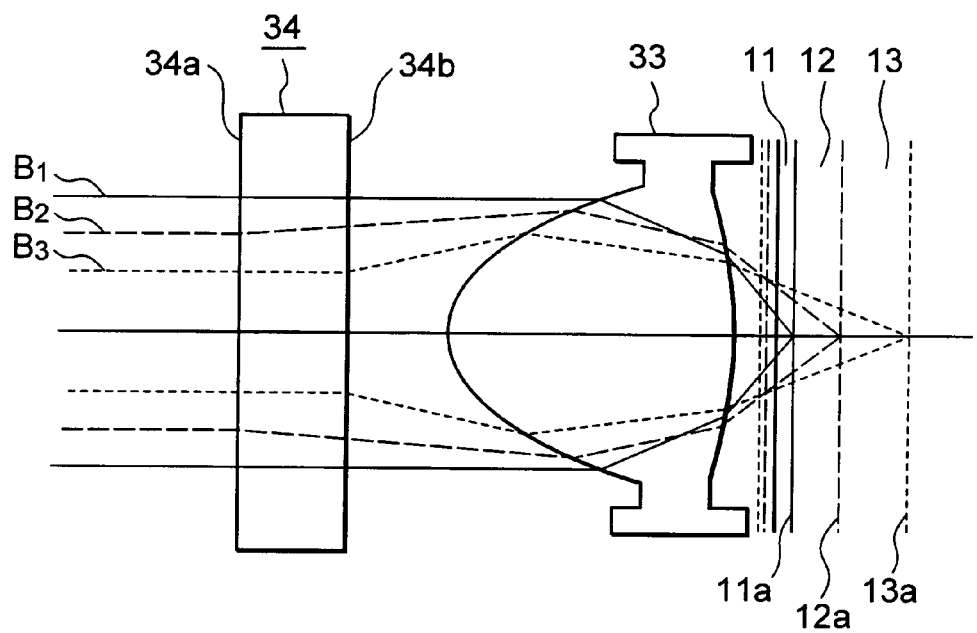
FIG. 3 is a sectional view showing a diffractive optical element and an objective lens constituting the optical pickup to which the present invention is applied.

As shown in FIGS. 2 and 3, the light beam having the first wavelength emitted from the first emission part of the first light source section 31 is transmitted through the mirror face 39a of the second beam splitter 39. After being converted into the substantially parallel light by the collimator lens 36, the light beam having the first wavelength is incident on the first beam splitter 38.

The light beam having the first wavelength, which is incident on the first beam splitter 38, is transmitted through the mirror face 38 a to be incident on the diffractive optical element 34.

The light beam $B_1$ having the first wavelength, which is incident on the diffractive optical element 34, is transmitted through the first diffractive part 34a provided on the light-incident side and the second diffractive part 34b provided on the light-outgoing side to outgo toward the objective lens 33.

The light beam $B_1$ having the first wavelength, which is transmitted through the diffractive optical element 34, is condensed in an appropriate spot shape on the signal recording face 11a of the first optical disc 11 through the objective lens 33.

The light beam condensed on the first optical disc 11 is reflected by the signal recording face 11a to be transmitted through the objective lens 33 and the diffractive optical element 34. Then, the light beam is reflected by the first beam splitter 38 to outgo toward the photodetector 35. The light beam having the first wavelength whose optical path is split by the first beam splitter 38 is condensed on the light-receiving face of the photodetector 35 by the optical element 41 so as to be detected.

Next, the optical path for reading or writing information from/on the second optical disc 12 will be described.

After having determined that the type of the optical disc 2 is the second optical disc 12, the disc type determining means 22 causes the second emission part of the second light source section 32 to emit the light beam having the second wavelength.

As shown in FIGS. 2 and 3, the light beam having the second wavelength emitted from the second emission part of the second light source section 32 is reflected by the mirror face 39a of the second beam splitter 39. After being converted into the substantially parallel light by the collimator lens 36, the light beam having the second wavelength is incident on the first beam splitter 38.

The light beam having the second wavelength, which is incident on the first beam splitter 38, is transmitted through the mirror face 38a to be incident on the diffractive optical element 34.

The light beam $B_2$ having the second wavelength, which is incident on the diffractive optical element 34, is diffracted by the first diffractive part 34 a provided on the light-incident side and is then transmitted through the second diffractive part 34b provided on the light-outgoing side to outgo toward the objective lens 33.

The light beam $B_2$ having the second wavelength, which is diffracted by the first diffractive part 34a of the diffractive optical element 34, is condensed in an appropriate spot shape on the signal recording face 12a of the second optical disc 12 through the objective lens 33.

Since the optical path for the return light beam reflected by the signal recording face 12 of the second optical disc 12 is similar to that of the light beam having the first wavelength described above, the description thereof is herein omitted.

Next, the optical path for reading or writing information from/on the third optical disc 13 will be described.

After having determined that the type of the optical disc 2 is the third optical disc 13, the disc type determining means 22 causes the third emission part of the second light source section 32 to emit the light beam having the third wavelength.

As shown in FIGS. 2 and 3, the light beam having the third wavelength emitted from the third emission part of the second light source section 32 is reflected by the mirror face 39a of the second beam splitter 39. After being converted into the substantially parallel light by the collimator lens 36, the light beam having the third wavelength is incident on the first beam splitter 38.

The light beam having the third wavelength, which is incident on the first beam splitter 38, is transmitted through the mirror face 38a to be incident on the diffractive optical element 34.

The light beam $B_3$ having the third wavelength, which is incident on the diffractive optical element 34, is transmitted through the first diffractive part 34a provided on the light-incident side and is then diffracted by the second diffractive part 34b provided on the light-outgoing side to outgo toward the objective lens 33. At this time, as described above, the second diffractive part 34b allows the passing −first-order light of the light beam having the third wavelength to be incident on the objective lens 33 at such a divergent angle that allows the −first-order light to be condensed in an appropriate spot shape on the signal recording face 13a of the third optical disc 13 by the objective lens 33. Moreover, the second diffractive part 34b regulates the balance of the ±first-order light to unbalance the amounts of diffraction, that is, to increase the amount of diffraction of the −first-order light and to reduce the amount of diffraction of the +first-order light. As a result, the light can be condensed through the objective lens 33 in an appropriate amount. At the same time, the generation of stray light can be prevented.

The light beam $B_3$ having the third wavelength, which is diffracted by the second diffractive part 34b of the diffractive optical element 34, is condensed in an appropriate spot shape on the signal recording face 13a of the third optical disc 13 through the objective lens 33.

Since the optical path for the return light reflected by the signal recording face 13a of the third optical disc 13 is similar to that of the light beam having the first wavelength described above, the description thereof is herein omitted.

In the optical pickup 3 to which the present invention is applied, the first diffractive part 34a of the diffractive optical element 34 diffracts the light beam having the second wavelength to cause the light beam having the second wavelength to be incident on the objective lens 33 in an optimal amount at an optimal divergent angle. Furthermore, the second diffractive part 34b of the diffractive optical element 34 diffracts the light beam having the third wavelength to cause the light beam having the third wavelength to be incident on the objective lens 33 in an optimal amount at an optimal divergent angle. Therefore, by the objective lens 33 common to the signal recording faces of the plurality of types of optical discs 11 to 13, each including the protective substrate having a different thickness, a spot shape of the light beam having each wavelength can be made appropriate.

Therefore, the optical pickup 3, to which the present invention is applied, enables the reading and writing of a signal from/on the plurality of types of optical discs, each including the protective substrate having a different thickness. At the same time, the optical components can be commonly used. Therefore, the configuration can be simplified and reduced in size to reduce the fabrication cost.

Moreover, in the optical pickup 3 to which the present invention is applied, the second diffractive part 34b transmits the light beams having the first and second wavelengths. At the same time, the second diffractive part 34b diffracts the −first-order light of the light beam having the third wavelength at a predetermined divergent angle with an increased amount of diffraction while diffracting the +first-order light with a reduced amount of diffraction. Therefore, the −first-order light of the light beam having the third wavelength can be condensed in an appropriate spot shape in an appropriate amount of diffraction on the third optical disc, whereas the diffracted light at the order which may possibly generate stray light can be reduced. Accordingly, the generation of stray light can be prevented.

Furthermore, the optical disc apparatus 1, to which the present invention is applied, includes the optical pickup 3 described above to enable the reading and writing of a signal from/on a plurality of types of optical discs. In addition, the optical components can be commonly used. Therefore, the configuration can be simplified and reduced in size to reduce the fabrication cost.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a first light source which emits a light beam having a first wavelength;
a second light source which emits a light beam having a second wavelength;
a third light source which emits a light beam having a third wavelength;
an objective lens which condenses each of the light beams emitted from the first to third light sources on a signal recording face of an optical disc;
a collimator lens provided between the first to third light sources and the objective lens to convert a divergent angle of each of the light beams emitted from the first to third light sources so as to obtain a parallel light beam; and
a diffractive optical element provided between the collimator lens and the objective lens,
wherein:
the diffractive optical element includes a first diffractive part which diffracts the light beam having the second wavelength and a second diffractive part which diffracts the light beam having the third wavelength,
the second diffractive part has a diffraction structure formed by a plurality of concentric ring zones,
the diffraction structure includes first, second, third, and fourth optical faces, each having a different height in an optical axis direction, formed in a stepwise and continuous manner,
each of the heights of the first to fourth optical faces in the optical axis direction is formed to substantially transmit the light beams having the first wavelength and the second wavelength and to diffract the light beam having the third wavelength into negative first-order diffracted light and positive first-order diffracted light whose amount of diffraction is less than the negative first-order diffracted light, and
the second diffractive part diffracts the light beam so that a ratio of the amount of diffraction of the negative first-order diffracted light of the light beam having the third wavelength to the amount of diffraction of the positive first-order diffracted light is 1.5 or larger.

2. The optical pickup according to claim 1, wherein a level difference between the second optical face and the third optical face is set larger than that between the first optical face and the second optical face and that between the third optical face and the fourth optical face.

3. An optical pickup comprising:
a first light source which emits a light beam having a first wavelength;
a second light source which emits a light beam having a second wavelength;
a third light source which emits a light beam having a third wavelength;
an objective lens which condenses each of the light beams emitted from the first to third light sources on a signal recording face of an optical disc;
a collimator lens provided between the first to third light sources and the objective lens to convert a divergent angle of each of the light beams emitted from the first to third light sources so as to obtain a parallel light beam; and
a diffractive optical element provided between the collimator lens and the objective lens,
the diffractive optical element includes a first diffractive part which diffracts the light beam having the second wavelength and a second diffractive part which diffracts the light beam having the third wavelength,
the second diffractive part has a diffraction structure formed by a plurality of concentric ring zones,
the diffraction structure includes first, second, third, and fourth optical faces, each having a different height in an optical axis direction, formed in a stepwise and continuous manner, and
a level difference $X_{13}$ between the first optical face and the third optical face satisfies a first formula:

$$5\times\lambda_1/(n_1-1)\leq X_{13}\leq 3\times\lambda_2/(n_2-1), \text{ and}$$

a level difference $X_{24}$ between the second optical face and the fourth optical face satisfies a second formula:

$$5\times\lambda_1/(n_1-1)\leq X_{24}\leq 3\times\lambda_2/(n_2-1)$$

where $\lambda_1$ is the first wavelength, $\lambda_2$ is the second wavelength, $n_1$ is a refractive index of the diffractive optical element with respect to the first wavelength, and $n_2$ is a refractive index of the diffractive optical element with respect to the second wavelength.

4. An optical pickup comprising:
a first light source which emits a light beam having a first wavelength;
a second light source which emits a light beam having a second wavelength;
a third light source which emits a light beam having a third wavelength;
an objective lens which condenses each of the light beams emitted from the first to third light sources on a signal recording face of an optical disc;
a collimator lens provided between the first to third light sources and the objective lens to convert a divergent angle of each of the light beams emitted from the first to third light sources so as to obtain a parallel light beam; and a diffractive optical element provided between the collimator lens and the objective lens, the diffractive optical element includes a first diffractive part which diffracts the light beam having the second wavelength and a second diffractive part which diffracts the light beam having the third wavelength, the second diffractive part has a diffraction structure formed by a plurality of concentric ring zones, the diffraction structure includes first, second, third, and fourth optical faces, each having a different height in an optical axis direction, formed in a stepwise and continuous manner, and a level difference $X_{12}$ between the first optical face and the second optical face satisfies a first formula:

$$0.065 \times \lambda_1/(n_1-1) \leq X_{12} < 0.165 \times \lambda_1/(n_1-1), \text{ and}$$

a level difference $X_{34}$ between the third optical face and the fourth optical face satisfies a second formula:

$$0.065 \times \lambda_1/(n_1-1) \leq X_{34} \leq 0.165 \times \lambda_1/(n_1-1),$$

where $\lambda_1$ is the first wavelength, and $n_1$ is a refractive index of the diffractive optical element with respect to the first wavelength.

5. An optical disc apparatus comprising:

an optical pickup for recording and/or reproducing information on/to a plurality of different types of optical discs; and disk rotational driving means for rotatably driving the optical disc, wherein:

the optical pickup includes:
  a first light source which emits a light beam having a first wavelength;
  a second light source which emits a light beam having a second wavelength;
  a third light source which emits a light beam having a third wavelength;
  an objective lens which condenses each of the light beams emitted from the first to third light sources on a signal recording face of the optical disc;
  a collimator lens provided between the first to third light sources and the objective lens to convert a divergent angle of each of the light beams emitted from the first to third light sources so as to obtain a parallel light beam; and a diffractive optical element provided between the collimator lens and the objective lens, wherein:

the diffractive optical element includes a first diffractive part for diffracting the light beam having the second wavelength and a second diffractive part for diffracting the light beam having the third wavelength, the second diffractive part has a diffraction structure formed by a plurality of concentric ring zones, the diffraction structure includes first, second, third, and fourth optical faces, each having a different height in an optical axis direction, formed in a stepwise and continuous manners, each of the heights of the first to fourth optical faces in the optical axis direction is formed to substantially transmit the light beams having the first wavelength and the second wavelength and to diffract the light beam having the third wavelength into negative first-order diffracted light and positive first-order diffracted light whose amount of diffraction is less than the negative first-order diffracted light, and the second diffractive part diffracts the light beam so that a ratio of the amount of diffraction of the negative first-order diffracted light of the light beam having the third wavelength to the amount of diffraction of the positive first-order diffracted light is 1.5 or larger.

6. An optical disc apparatus comprising:

an optical pickup for recording and/or reproducing information on/to a plurality of different types of optical discs; and disk rotational driving means for rotatably driving the optical disc, wherein:

the optical pickup includes:
  a first light source which emits a light beam having a first wavelength;
  a second light source which emits a light beam having a second wavelength;
  a third light source which emits a light beam having a third wavelength;
  an objective lens which condenses each of the light beams emitted from the first to third light sources on a signal recording face of the optical disc;
  a collimator lens provided between the first to third light sources and the objective lens to convert a divergent angle of each of the light beams emitted from the first to third light sources so as to obtain a parallel light beam; and
  a diffractive optical element provided between the collimator lens and the objective lens, the diffractive optical element includes a first diffractive part for diffracting the light beam having the second wavelength and a second diffractive part for diffracting the light beam having the third wavelength, the second diffractive part has a diffraction structure formed by a plurality of concentric ring zones, the diffraction structure includes first, second, third, and fourth optical faces, each having a different height in an optical axis direction, formed in a stepwise and continuous manner, and a level difference $X_{13}$ between the first optical face and the third optical face satisfies a first formula:

$$5 \times \lambda_1/(n_1-1) \leq X_{13} \leq 3 \times \lambda_2/(n_2-1), \text{ and}$$

a level difference $X_{24}$ between the second optical face and the fourth optical face satisfies a second formula:

$$5 \times \lambda_1/(n_1-1) \leq X_{24} \leq 3 \times \lambda_2/(n_2-1)$$

where $\lambda_1$ is the first wavelength, $\lambda_2$ is the second wavelength, $n_1$ is a refractive index of the diffractive optical element with respect to the first wavelength, and $n_2$ is a refractive index of the diffractive optical element with respect to the second wavelength.

7. An optical disc apparatus comprising:

an optical pickup for recording and/or reproducing information on/to a plurality of different types of optical discs; and disk rotational driving means for rotatably driving the optical disc, wherein:

the optical pickup includes:
  a first light source which emits a light beam having a first wavelength;
  a second light source which emits a light beam having a second wavelength;

a third light source which emits a light beam having a third wavelength;

an objective lens which condenses each of the light beams emitted from the first to third light sources on a signal recording face of the optical disc;

a collimator lens provided between the first to third light sources and the objective lens to convert a divergent angle of each of the light beams emitted from the first to third light sources so as to obtain a parallel light beam; and a diffractive optical element provided between the collimator lens and the objective lens, the diffractive optical element includes a first diffractive part for diffracting the light beam having the second wavelength and a second diffractive part for diffracting the light beam having the third wavelength, the second diffractive part has a diffraction structure formed by a plurality of concentric ring zones, the diffraction structure includes first, second, third, and fourth optical faces, each having a different height in an optical axis direction, formed in a stepwise and continuous manner, and a level difference $X_{12}$ between the first optical face and the second optical face satisfies a first formula:

$$0.065 \times \lambda_1/(n_1-1) \leq X_{12} < 0.165 \times \lambda_1/(n_1-1), \text{ and}$$

a level difference $X_{34}$ between the third optical face and the fourth optical face satisfies a second formula:

$$0.065 \times \lambda_1/(n_1-1) \leq X_{34} \leq 0.165 \times \lambda_1/(n_1-1),$$

where $\lambda_1$ is the first wavelength, and $n_1$ is a refractive index of the diffractive optical element with respect to the first wavelength.

* * * * *